United States Patent Office 3,549,551
Patented Dec. 22, 1970

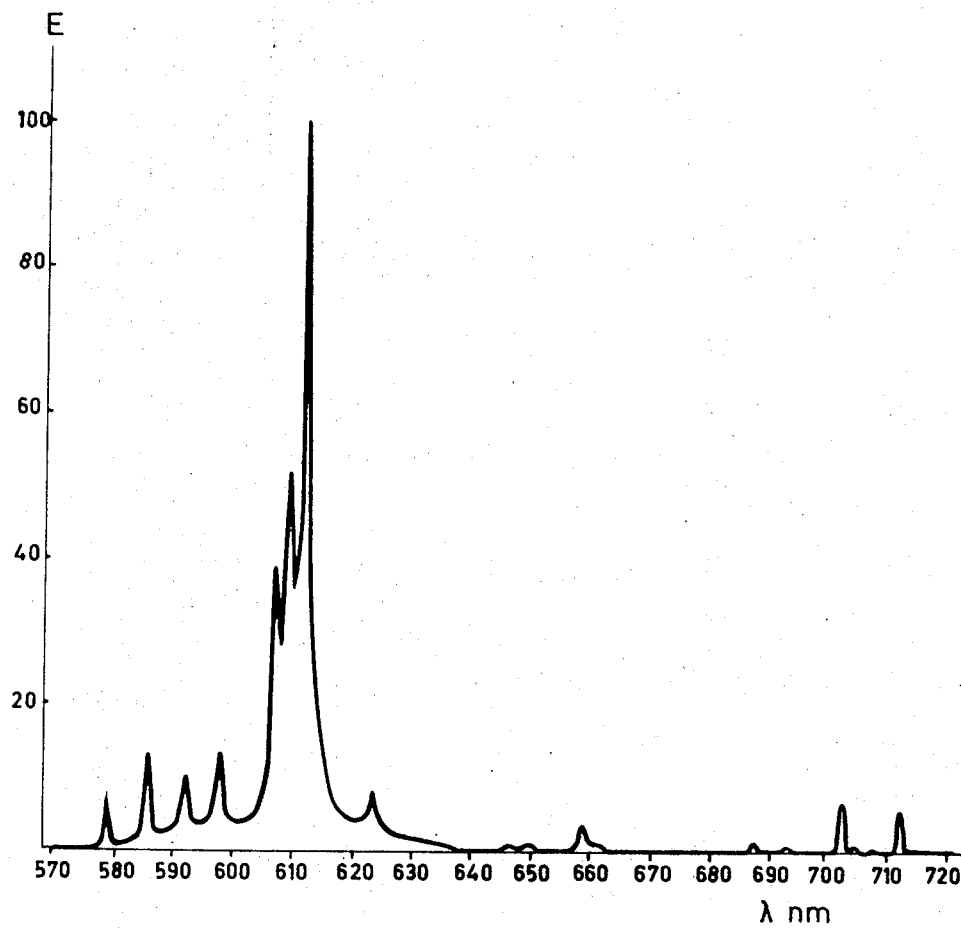

3,549,551
EUROPIUM ACTIVATED LITHIUM INDIUM SILICATE
Roelof Egbert Schuil, Emmasingel, Eindhoven, Netherlands, assignor, by mesne assignments, to U.S. Philips Corporation, New York, N.Y., a corporation of Delaware
Filed Jan. 30, 1968, Ser. No. 701,735
Claims priority, application Netherlands, Feb. 1, 1967, 6701518
Int. Cl. C09k 1/54
U.S. Cl. 252—301.4                 2 Claims

ABSTRACT OF THE DISCLOSURE

Red luminescent phosphor useful for color television display tubes comprising a europium activated lithium indium silicate.

---

The invention relates to a luminescent screen containing a red luminescing material, to this red luminescing material and to a cathode-ray tube for displaying colored pictures provided with such a screen containing such a material.

Recently, many red luminescing materials have been described for use in cathode-ray tubes for displaying colored pictures, more particularly color television pictures, and for use in high-pressure mercury vapor discharge lamps. In cathode-ray tubes, these materials naturally serve to reproduce the red component of the image; in high-pressure mercury vapor discharge lamps, the red luminescent material is applied in order to replenish the deficiency of radiation in the red part of the spectrum of the mercury vapor discharge.

Although materials usable for the above applications have been known for a long time, the research of recent years has been concentrated especially to compounds containing as activator one or more of the elements of the group of lanthanides. (This group of lanthanides is often also referred to as the group of rare earth metals.) When compared with most of the known luminescent materials, red luminescing compounds activated with one or more of the lanthanide elements have the large advantage that the emission lies for the major part within a very small wavelength range in the red part of the spectrum. This is of course advantageous not only because the colour of the emitted red light is very pure, but especially also because no energy from the excitation medium (electrons or ultraviolet radiation) is lost by conversion into light in ranges of the emission spectrum in which no radiation is desired.

A few examples of such new materials are europium activated yttrium vanadate, europium-activated gadolinium oxide and europium-activated yttrium oxide. In all these compounds, the europium is trivalent. Especially the first-mentioned material is already frequently used in cathode-ray tubes for displaying coloured television pictures and for correction of the light of high-pressure mercury vapour discharge lamps. In the manufacture of the luminiscent screen of a cathode-ray tube containing this vanadate, it is of great advantage that no unsurmountable difficulties are involved in processing, for example in the application. For the material is sparingly soluble in water and in the liquids commonly used in the manufacture of such screens. Furthermore, it is fairly capable of withstanding the high temperatures which are used, as is known, during the manufacture of such tubes. However, it has the large disadvantage that both europium and yttrium are very expensive. Since a high energy efficiency requires a comparatively large quantity of europium, the cost-price of the material is 700 to 900 Dutch Florins per kg.

The oxides of gadolinium and yttrium activated with trivalent europium are also very expensive, which is due inter alia to the comparatively high content of europium required to obtain a high energy efficiency. However, these two materials have the additional disadvantage that they are less insoluble in water than yttrium vanadate.

The emission spectra of the above materials are not entirely equal, although the desired strong red emission invariably lies within the range of 600 to 625 nm. However, besides this strong emission, the three materials all exhibit comparatively strong secondary emissions which adversely affect the conversion efficiency. Yttrium vanadate activated with trivalent europium, for example, exhibits a comparatively strong emission in the green and in the infrared range. This is disturbing not only because the energy efficiency in the desired red range is reduced, but also because the colour purity of a picture to be displayed is adversely affected.

A luminescent screen according to the invention contains a red luminescing material and is characterized in that this red luminescing material consists of a silicate of lithium, indium and trivalent europium corresponding to the formula

$$\text{LiIn}_{(1-x)}\text{Eu}_x^{+++}\text{SiO}_4$$

where $0.005 \leqslant x \leqslant 0.30$.

In the aforesaid material, europium serves as activator and produces the red emission. The limits for the content of europium which are given by the values of $x$ are chosen in accordance with the above formula, since both with higher and with lower contents of europium, the energy efficiency upon conversion strongly decreases. $x$ is preferably chosen to lie between the values 0.008 and 0.15, since the highest energy efficiencies are then obtained. When used in the display screen of a cathode-ray tube for displaying coloured pictures, the quantity of europium is preferably chosen so that $0.02 \leqslant x \leqslant 0.05$; when the luminescent screen is used in high-pressure mercury vapour discharge lamps, the content of europium is preferably chosen so that $x$ is approximately equal to 0.08. For with these contents, the maximum conversion efficiency is obtained upon the excitation mentioned.

Upon excitation both with electrons and with ultraviolet radiation having a wavelength of approximately 254 nm., the compounds according to the invention have a spectrum of emitted light lying substantially completely within the range between 606 and 618 nm. As is known, this range is of particular significance for colour television display cathode-ray tubes. In the wavelength range lying between 700 and 720 nm. an emission is found, it is true, but this emission is very low when compared with that in the aforesaid significant wavelength range. Secondary emissions also occur between 570 and 606 nm.; of course, these secondary emissions slightly affect the colour purity of the picture displayed in a cathode-ray tube, but this influence is not disturbing, since they lie in close proximity of the desired range, at any rate in the red part of the spectrum.

A very important advantage in comparison with the known materials described containing lanthanide elements is that the cost-price is considerably lower, i.e. only 250 to 400 Dutch Florins per kg. This is mainly due to the fact that the content of europium may be comparatively small. Moreover, the cost-price of indium is considerably lower than that of yttrium and gadolinium.

The material according to the invention further has the advantage that it has a white daylight colour; as a result, a colour shift does not occur when the screen is struck by incident light. In the manufacture of cathoderay tubes, it is of great advantage that the materials according to the invention are very sparingly soluble in water and have a high stability when they are heated. In the manufacture of the luminescent material itself, it is advantageous that a variation of the content of europium within the limits set forth only slightly affects the energy efficiency and the colour of the emitted luminescent light. Thus, the preparation is not very critical.

The invention will now be described with reference to two examples of preparation and a drawing.

EXAMPLE 1

74 gms. = 1 mol of $Li_2CO_3$
267 gms. = 0.96 mol of $In_2O_3$
14 gms. = 0.04 mol of $Eu_2O_3$
120 gms. = 2 mols of $SiO_2$ are mixed. This mixture is heated in air for two hours at a temperature of 800° C. The resultant reaction product is ground, is sieved, if required, and is then again heated in air for two hours at a temperature of 1100° C. The reaction product obtained after the second thermal treatment is ground and sieved, if required, and is then ready for use.

EXAMPLE 2

74 gms. = 1 mol of $Li_2O_3$
256 gms. = 0.92 mol of $In_2O_3$
28 gms. = 0.08 mol of $Eu_2O_3$
120 gms. = 2 mol of $SiO_2$ are mixed. The preparation is further similar to that of Example 1.

A measurement showed that the material of Example 1 had an energy efficiency of 5.5% and the material of Example 2 had an energy efficiency of 5.0%. The excitation was effected by means of electrons having an energy of about 10 to 15 kv.

The emission spectrum of the two materials was equal and is shown in the drawing. This drawing shows a graph in which the wavelength in mm. is plotted on the abscissa and the measured intensity in arbitrary units is plotted on the ordinate. The peak value of the emission at approximately 612 nm. is assumed to be 100.

The red luminescing material is applied in known manner to the screen of the cathode-ray tube to be manufactured or to the support of the luminescent colour-correction layer of a high-pressure mercury vapour discharge lamp (which is generally a bulb surrounding the discharge tube proper).

What is claimed is:

1. A red luminescing phosphor consisting essentially of a trivalent europium activated silicate of lithium and indium of the formula $$LiIn_{(1-x)}Eu_x^{+++}SiO_4$$

wherein $0.005 \leqslant x \leqslant 0.30$.

2. The phosphor of claim 1 wherein $0.008 \leqslant x \leqslant 0.15$.

References Cited

UNITED STATES PATENTS

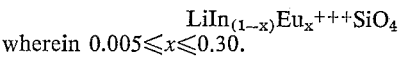

TOBIAS E. LEVOW, Primary Examiner

R. D. EDMONDS, Assistant Examiner